United States Patent [19]

Kokuryu

[11] Patent Number: 4,762,150
[45] Date of Patent: Aug. 9, 1988

[54] HOSE HAVING ORIFICE

[75] Inventor: Yuji Kokuryu, Aichi, Japan

[73] Assignee: Toyoda Gosei Co., Ltd., Nishikasugai, Japan

[21] Appl. No.: 15,510

[22] Filed: Feb. 17, 1987

Related U.S. Application Data

[63] Continuation of Ser. No. 817,531, Jan. 9, 1986, abandoned.

[30] Foreign Application Priority Data

Jan. 31, 1985 [JP] Japan ............................. 60-18415

[51] Int. Cl.4 .................... F16L 55/02; F16L 55/04
[52] U.S. Cl. ...................................... 138/44; 181/196
[58] Field of Search ........................... 29/505–508; 138/44, 120; 285/256, 398; 181/196, 207, 208, 224, 227, 230, 233, 248

[56] References Cited

U.S. PATENT DOCUMENTS 3,442,537  5/1969  Courtot et al. ............. 285/256 X
3,517,700  6/1970  Williams et al. ................. 138/44
3,859,837  1/1975  Burroughs ................... 29/508 X
4,285,534  8/1981  Katayama et al. ............ 138/44 X
4,400,863  8/1983  Schroeder .................. 138/120 X

FOREIGN PATENT DOCUMENTS 128897 of 1919 United Kingdom ............... 285/398

Primary Examiner—Mark J. Thronson
Attorney, Agent, or Firm—Cushman, Darby & Cushman

[57]  ABSTRACT

A hose having an orifice is disclosed. The hose comprises a nipple which is provided in one part of the inside of the hose for the purpose of forming an orifice; a sleeve which is fitted over the outer surface of the hose at a position corresponding to the nipple, the sleeve having a caulking portion for fixing the nipple such as to make it axially unmovable, and the caulking portion being shorter than the length of the nipple; and at least one pair of protrusions which are formed on the outer peripheral surface of the nipple, and which are retained by the inner surface of the hose and prevent the nipple from moving, the protrusions being situated at both ends of the nipple at positions which do not correspond to the caulking portion.

6 Claims, 1 Drawing Sheet

HOSE HAVING ORIFICE

This is a continuation of application Ser. No. 817,531, filed Jan. 9, 1986, which was abandoned upon the filing hereof.

BACKGROUND OF THE INVENTION

1. Field of the Invention

This invention relates to a hose such as a power steering hose and, more particularly, to a hose having an orifice at a predetermined position of an intermediate portion of the hose.

2. Description of the Related Art

A hose such as a power steering hose sometimes produces unpleasant noise caused by the pressure pulsation of a hydraulic pump or the like.

To prevent the generation of noise, an orifice such as is shown in FIG. 3 is conventionally provided at a predetermined position within the length of a hose. A cylindrical nipple 22 made of a metal is inserted into a hose 21, and three grooves 23 are formed on the outer peripheral surface of the nipple 22 in order to better prevent the nipple from sliding out due to the flow of oil. A sleeve 24 is fitted over the hose 21 at the position corresponding to the nipple 22 and is caulked inwardly by a caulking jig 25, thereby tightening the nipple 22.

In this example of the related art, however, the nipple 22 sometimes inconveniently slides in the axial direction when the sleeve 24 is caulked, because the rubber or the like which constitutes the hose 21 is caused to bulge sidewardly by the caulking operation. This phenomenon makes it impossible to obtain an adequate tightening force. The grooves 23 are provided on the nipple 22 for the purpose of preventing the nipple from sliding out of the hose and move sidewardly with the deformation of the rubber.

The only possible method of preventing the above-described movement of the nipple is to bring rod-like jigs 26 into contact with both ends of the nipple 22 when caulking the sleeve 24, thereby forcibly suppressing the movement of the nipple 22. Performance of this step greatly lowers the total efficiency of the hose mounting operation.

SUMMARY OF THE INVENTION

Accordingly, it is an object of the present invention to provide a hose having an orifice which enables the step of orifice formation to be efficiently carried out when the nipple is installed into the hose, without any occurrence of axial movement of a nipple provided in the hose and, hence, eliminating any need for the provision of a jig for positioning the nipple at the time of mounting the hose.

To achieve this aim, a hose having an orifice according to the present invention comprises a nipple which is provided at one part of the inside of the hose for the purpose of forming an orifice; a sleeve which is fitted over the outer surface of the hose at the position corresponding to the nipple, the sleeve having a caulking portion for fixing the nipple such as to make it axially unmovable, and the caulking portion being shorter than the length of the nipple; and at least one pair of protrusions which are formed on the outer peripheral surface of the nipple, and which are retained by the inner surface of the hose and prevent the nipple from moving, the protrusions being situated at both ends of the nipple at positions which do not correspond to the caulking portion.

Other and further objects of the invention will become obvious upon an understanding of the illustrative embodiments which are about to be described or will be indicated in the appended claims, and various advantages not referred to herein will occcur to one skilled in the art upon employment of the invention in practice.

DETAILED DESCRIPTION OF THE PREFERRED EMBODIMENTS

Figure 1:
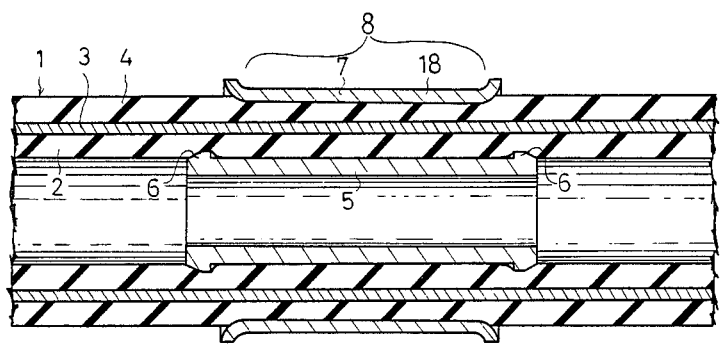
FIG. 1 is a sectional view of an embodiment of the present invention.

Hereinunder an embodiment of a power steering hose according to the present invention will be explained with reference to FIG. 1.

A hose 1 in this embodiment is composed of an inner rubber layer 2, an intermediate reinforcing yarn layer 3 consisting of polyester fiber or the like, and an outer rubber layer 4. The outer diameter of the hose 1 is 19.5 mm, its inner diameter is 9.5 mm and its thickness is 5 mm.

A metal nipple 5 is inserted into the hose 1 at a predetermined position in order to form an orifice, the length of the nipple is 30 mm, its outer diameter is 9 mm, and its inner diameter is 6 mm. A pair of ridges 6 extending around the entire peripheral surface of the nipple 5 are formed at both ends thereof in order to prevent the nipple 5 from sliding out, and the length of each ridge 6 in the axial direction of the nipple 5, measured from the edge of the nipple, is 2 mm, and the height thereof is 0.5 mm.

A metal sleeve 7 is fitted over the hose 1 at the position corresponding to the nipple 5. A caulking portion 8 is formed over the sleeve 7 except for both end portions thereof so as to define a recess 18 continuously extending in the axial direction of the sleeve 7. The length of the caulking portion 8 in the axial direction of the nipple is 20 mm. Therefore, the nipple 5 is formed so as to be longer than the caulking portion 8, and the ridges 6 are provided on the outer surface of the nipple at positions which do not correspond to the caulking portion 8.

The operational efficiency of the embodiment having the above-described structure will now be explained.

When the caulking portion 8 of the sleeve 7 is caulked, the rubber material constituting the hose 1 at the position where the diameter of the hose 1 is reduced by the caulking portion is caused to bulge to both sides in the longitudinal direction of the hose 1, and, at the same time, the nipple 5 is tightened and pressed firmly against the inner surface of the hose 1. Therefore, the nipple 5 is about to move in an unbalanced manner toward either side in the longitudinal direction of the hose 1.

However, the ridges 6 provided at both ends of the nipple 5 do not correspond to the caulking portion 8, and protrude into the inner surface of the hose 1 without being directly influenced by the bulging of the rubber material. The ridges 6 receive the sidewardly-bulging portions of the rubber in such a manner that they clamp them.

Accordingly, the nipple 5 is securely retained in the hose 1 by the ridges 6, and does not slide in either direction without the need of the rod-like jigs 26 which are essential in the related art.

Thus, the efficiency of the orifice formation process is greatly enhanced, and, in addition, since the nipple can be securely tightened, a stable nipple-tightening force is efficiently obtained.

Figure 2:
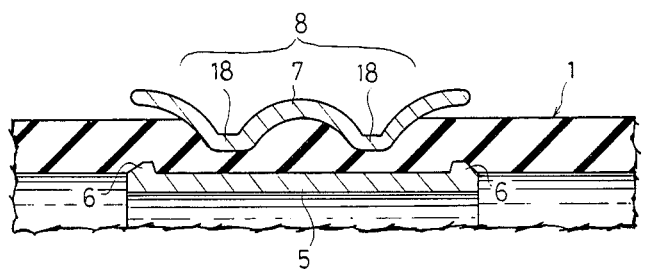
FIG. 2 is a partially sectional view of another embodiment of the present invention.
Figure 3:
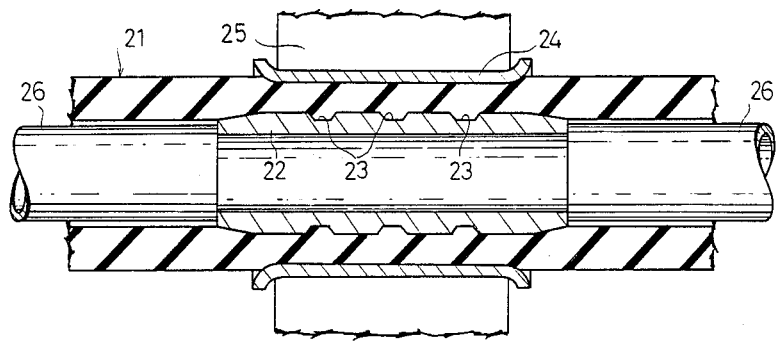
FIG. 3 is a sectional view of an example in the related art.

The present invention is not restricted to the structure of this embodiment, and any modifications, such as those exemplified in the following, are possible within the scope of the present inventive concept. (1) A plurality of recesses 18 may be formed in the caulking portion 8 of the sleeve 7, spaced in the axial direction of the sleeve 7, as shown in FIG. 2, in place of the single recess 18. (2) In the above-described two embodiments the ratio of the height of the ridges 6 of the nipple 5 to the thickness of the hose 1 is 10%, but this may be changed preferably under the condition that the ratio is selected to be within the range of 6 to 20% (the height of the ridge 6 is within the range of 0.3 to 1 mm in the case of the above-described embodiments). This ratio range is determined by the factors that if it is less than 6%, the nipple 5 may slip out, while if it is greater than 20%, the nipple 5 may damage the inner surface of the hose 1.

However, if the hose 1 is not provided with the reinforcing yarn layer 3 and is made of rubber alone, the maximum height of the ridge 6 can be 40% of the thickness of the hose. (3) The ridges 6 may be replaced by a plurality of short protrusions. (4) The dimensions of each portion of the nipple 5 and the sleeve 7 may be varied so long as the following conditions are satisfied: (a) the nipple 5 is formed to be longer than the caulking portion 8 of the sleeve 7, and (b) ridges for preventing the nipple from slipping out are provided on the outer surface of the nipple 5 at both ends thereof which do not correspond to the caulking portion 8. (5) The nipple 5 may be formed of a synthetic resin. (6) The present invention may be applied to a hose other than a power steering hose.

As described above in detail, the present invention is very advantageous in that it can greatly improve the efficiency of the orifice formation process, and in that a stable nipple-tightening force is obtained.

As many apparently widely different embodiments of this invention may be made without departing from the spirit and scope thereof, it is to be understood that the invention is not limited to the specific embodiments thereof, except as defined in the appended claims.

What is claimed is:

1. A system comprising:
a hose of flexible material having a substantially continuous section of uniform cross section;
an orifice forming substantially rigid nipple disposed in the interior of said continuous section of said hose and having a passage therethrough of smaller cross-sectional area than the interior of said hose section for absorbing fluid pulsations in said hose and preventing generation of noise, said nipple having at least one pair of generally-alike, longitudinally-spaced protrusions on the outer surface and at both ends of said nipple, said nipple being of generally uniform thickness in radial section between said protrusions and said protrusions being engaged with the inner surface of said hose section to prevent said nipple form moving longitudinally within said hose; and
a metal sleeve exteriorly snugly surrounding said hose about said nipple, said sleeve having a caulked portion shorter than the distance between said protrusions for fixing said nipple against longitudinal movement within said hose.

2. A system according to claim 1 wherein said caulked portion of said sleeve is provided with one circumferential recess which continuously extends between said protrusions.

3. A system according to claim 1, wherein said caulked portion of said sleeve is provided with a plurality of longitudinally spaced circumferential recesses.

4. A system according to claim 1, wherein said protrusions are a pair of circumferential ridges which extend around the entire peripheral surface of said nipple.

5. A system according to claim 1, wherein each of said protrusions has a height which is 6 to 40% of the radial thickness of said hose.

6. The system defined in claim 1 wherein the sleeve is of generally uniform thickness in radial section throughout its length.

* * * * *